(12) United States Patent
Kim

(10) Patent No.: US 8,915,512 B2
(45) Date of Patent: Dec. 23, 2014

(54) VEHICLE FRAME AND COMPONENT DESIGN FOR EFFICIENT AND COMPACT PACKAGING

(75) Inventor: Daniel Kee Young Kim, San Francisco, CA (US)

(73) Assignee: Lit Scooters Corporation, San Francisco, CA (US)

( * ) Notice: Subject to any disclaimer, the term of this patent is extended or adjusted under 35 U.S.C. 154(b) by 0 days.

(21) Appl. No.: 13/592,174

(22) Filed: Aug. 22, 2012

(65) Prior Publication Data
US 2013/0048401 A1 Feb. 28, 2013

Related U.S. Application Data

(60) Provisional application No. 61/526,086, filed on Aug. 22, 2011.

(51) Int. Cl.
*B62K 11/02* (2006.01)
*B62K 15/00* (2006.01)
*B65B 25/00* (2006.01)

(52) U.S. Cl.
CPC ............ *B62K 15/00* (2013.01); *B62K 2202/00* (2013.01); *B62K 2204/00* (2013.01); *B62K 208/00* (2013.01); *B65B 25/00* (2013.01)
USPC ........................................ 280/287

(58) Field of Classification Search
USPC ........................................ 180/220
See application file for complete search history.

(56) References Cited

U.S. PATENT DOCUMENTS

| | | | | | |
|---|---|---|---|---|---|
| 2,839,146 | A | * | 6/1958 | Bouffort | 180/208 |
| 2,910,130 | A | * | 10/1959 | Schlaphoff | 180/208 |
| 3,316,993 | A | * | 5/1967 | Weitzner | 180/208 |
| 4,094,374 | A | * | 6/1978 | Adams | 180/208 |
| 6,273,442 | B1 | | 8/2001 | Fallon et al. | |
| 8,388,005 | B2 | * | 3/2013 | Kim et al. | 280/287 |

FOREIGN PATENT DOCUMENTS

| | | |
|---|---|---|
| EP | 0416529 | 3/1991 |
| JP | 2003146280 | 5/2003 |
| WO | WO-0212057 | 2/2002 |

OTHER PUBLICATIONS

International Preliminary Report on Patentability for International Application No. PCT/US2012/051890, mailed Mar. 6, 2014, 8 pages.
PCT International Search Report & Written Opinion of the ISA for PCT Application No. PCT/US2012/051890, mailed Jan. 29, 2013, 11 pages.

* cited by examiner

*Primary Examiner* — Tony Winner
(74) *Attorney, Agent, or Firm* — Blakely Sokoloff Taylor & Zafman

(57) ABSTRACT

Embodiments of the invention describe methods, apparatuses and systems related to vehicle frame and component design for efficient and compact packaging. Removable components of a scooter are formed to be able to all be placed within a void of the scooter frame so as to not affect the volume of the scooter when disassembled and packed. Thus, when disassembled, the volume of the packaged scooter is defined by the dimensions of its frame only.

18 Claims, 9 Drawing Sheets

US 8,915,512 B2

VEHICLE FRAME AND COMPONENT DESIGN FOR EFFICIENT AND COMPACT PACKAGING

CLAIM OF PRIORITY

This application claims priority to Provisional Application No. 61/526,086, entitled: "ASSEMBLE-ABLE SCOOTER", filed on Aug. 22, 2011.

FIELD OF THE INVENTION

Embodiments of the invention generally pertain to transportation vehicles, and more particularly to vehicle frame and component design for efficient and compact packaging.

BACKGROUND

Motorcycles and scooters are an attractive alternative over automobiles because of their lower cost of ownership and reduced energy consumption. One of the limitations a motorcycle or scooter has is the space occupied by the vehicle when it is to be transported (e.g., shipped from the manufacturer).

While assemble-able bicycles are known in the art, when disassembled their volumes are typically dominated by their wheels and tires. Collapsible stand-up scooters are known in the art, but these solutions contain fixed wheels and are often shipped completely assembled. These solutions do not effectively reduce the space of the vehicle when it is to be transported in a disassembled state.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DESCRIPTION

Embodiments of an apparatus, system and method for assembling and packaging an assemble-able scooter, motorcycle or any two-wheeled motorized vehicle (referred to herein as a "scooter" for exemplary purposes, and not to limit the embodiments) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
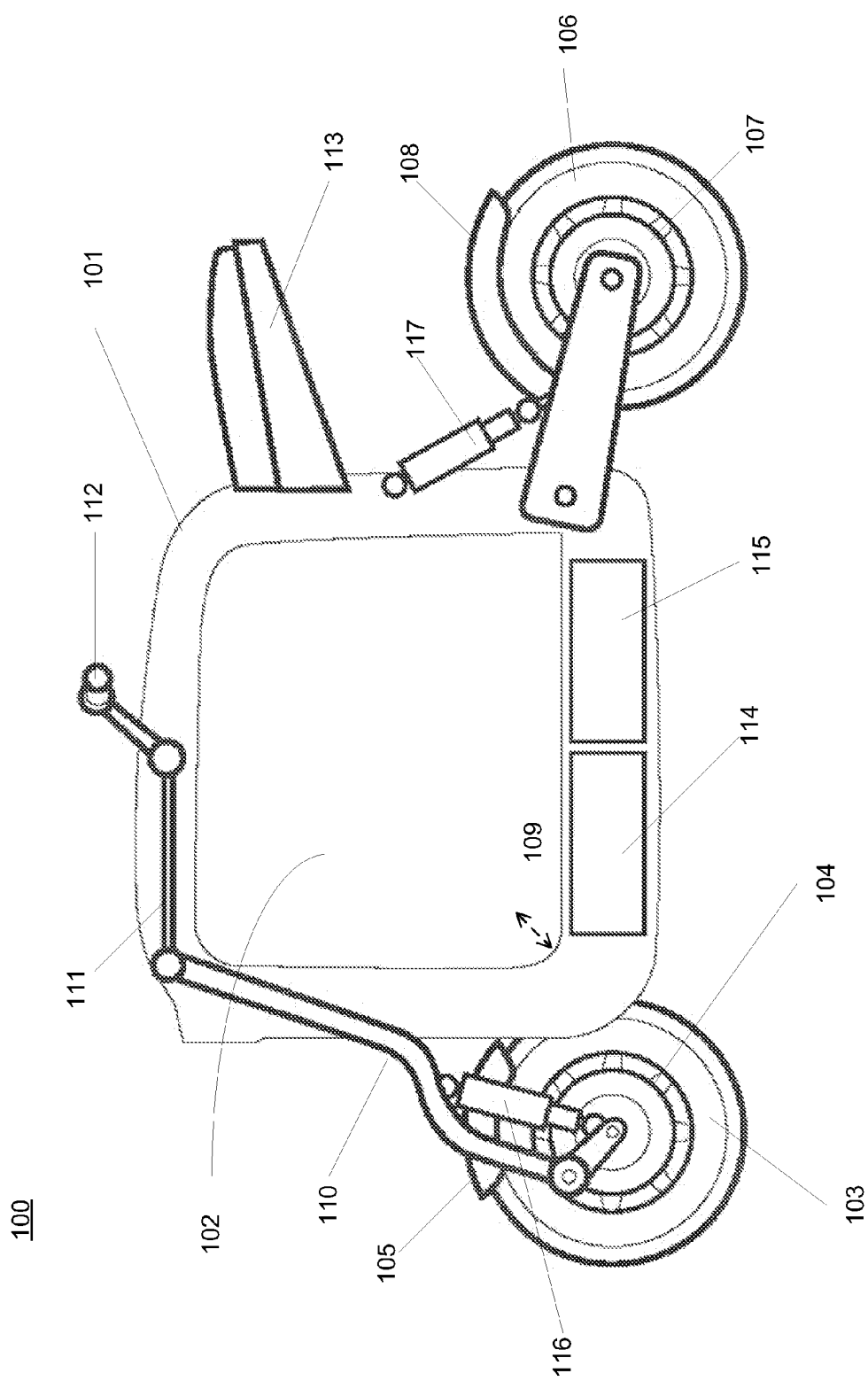
FIG. 1A is a diagram of an assembled scooter according to an embodiment of the invention.

FIG. 1A is a diagram of an assembled scooter according to an embodiment of the invention. In this embodiment, scooter 100 includes frame 101 having void 102. Said frame may comprise any material suitable for a scooter known in the art (e.g., metal, plastic composite, etc.). In this embodiment, frame 101 has a relatively rectangular shape (e.g., polygonal quadrilateral), and also has a rectangular formed closed path that forms void 102. In other embodiments, said frame and void may each be of different shapes (e.g., any polygonal, elliptical or free-form shape), and may each be unrelated different shapes (e.g., in an alternative embodiment, said frame may comprise a relatively circular shape, and said void may comprise a cyclic shape (i.e., a polygon with vertices upon which a circle can be circumscribed)).

Scooter 100 further includes front and rear wheel assemblies mounted to the front and back sides of scooter frame 101, respectively. In this embodiment, said front wheel assembly includes tire 103, wheel 104 (alternatively referred to herein as "rim assembly) and fender 105; said rear wheel assembly includes tire 106, rim assembly 107 and fender 108. Said front and rear wheel assemblies may have a width (or depth, depending on perspective) equal to the width of their respective tires (i.e., said tires are the widest part of the wheel assembly). In this embodiment, front tire 103 and rear tire 106 have a combined width equal to or less than "depth" 109 of void 102.

Scooter 100 further includes a steering assembly having at least one removable component, said steering assembly includes removable component 110, fixed component 111 and removable handlebars 112. In this embodiment, applying forward force on the right handlebar causes the front wheel assembly to rotate counterclockwise (from the riders perspective) or turn the vehicle left; applying forward force on the left handlebar causes the front wheel assembly to rotate clockwise (from the riders perspective) or turn the vehicle right. In other embodiments, alternative steering mechanisms that have at least one removable component may be utilized.

Scooter 100 further includes seat 113 that may be removably coupled to at least the back side of scooter frame 101. In this embodiment, scooter 100 further includes motor 114 and battery 115. In this example, said motor and battery are included within frame 101. In other embodiments, each of either motor 114 and battery 115 may be placed in other parts of frame 101, e.g., affixed external to the frame, within void 102, etc. In one embodiment, motor 114 is included in the rear wheel assembly, and does not protrude from the rear wheel assembly.

Scooter 100 further includes suspension components 116 and 117 to be removably coupled to the front and rear wheel assemblies, respectively.

Figure 1B:
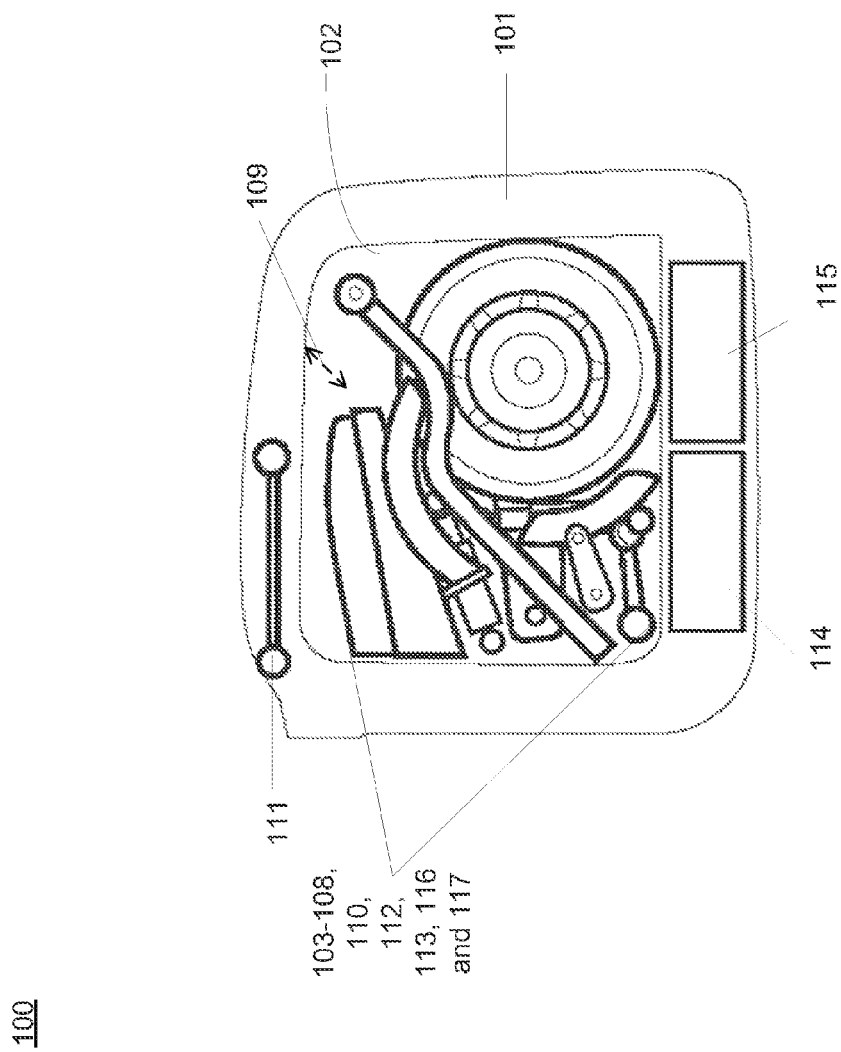
FIG. 1B and FIG. 1C are each illustrations of a packaged disassembled scooter according to an embodiment of the invention.

FIG. 1B is an illustration of a packaged disassembled scooter according to an embodiment of the invention. In this embodiment, components 103-108, 110, 112, 113, 116 and 117 are shown to be placed within void 102, wherein said front and rear wheel assemblies "stacked" on top of one other. As described above, front tire 103 and rear tire 106 have a combined width equal to or less than "depth" 109 of void 102. The remaining components placed within void 102 are designed to fit within void 102.

Figure 1C:
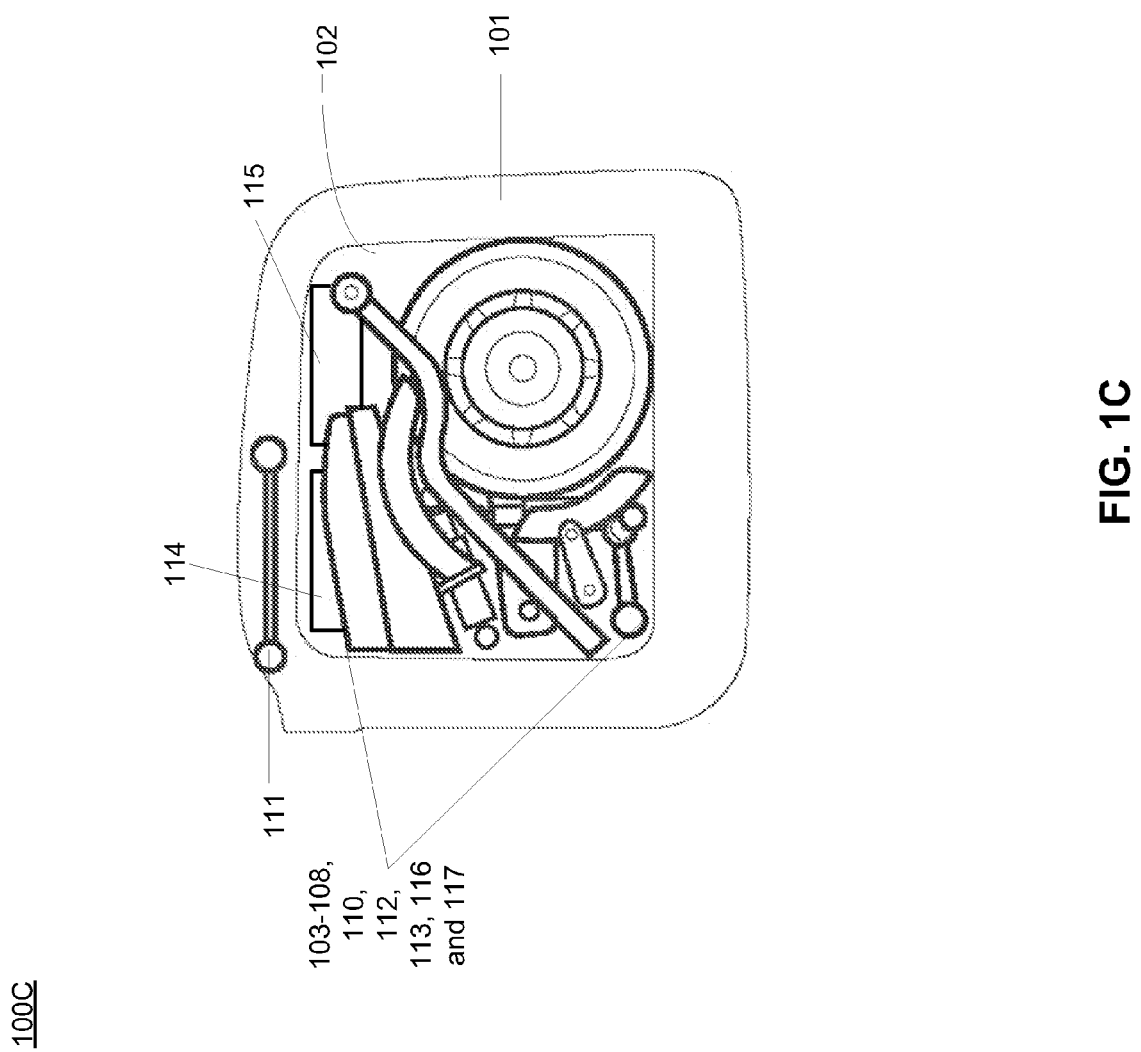

Thus, when disassembled, the volume of scooter 100 is defined by the dimensions of frame 101—the other components of the scooter are designed to be placed within the void so as to not affect the volume of the scooter when disassembled and packed. FIG. 1C illustrates an alternative embodiment, wherein removable battery 115 and removable drive motor 114 are formed to fit within void 102 of disassembled scooter 100C.

In this example embodiment, fixed assembly 111, motor 114 (e.g., a drive motor) and battery 115 are included within frame 101, and thus it is not necessary to place them within void 102 because they do not affect the defined volume of disassembled scooter 100. In other embodiments where said components are not to be included within frame 101, the other components of scooter 100 are designed to have dimensions to allow fixed assembly 111, motor 114 and/or battery 115 to be placed in void 102. As described above, in one embodiment, motor 114 is placed within the rear wheel assembly, and does not affect the width of the rear wheel assembly (i.e., the width of rear tire 106 will be the determining element of the width of the rear wheel assembly).

Figure 2A:
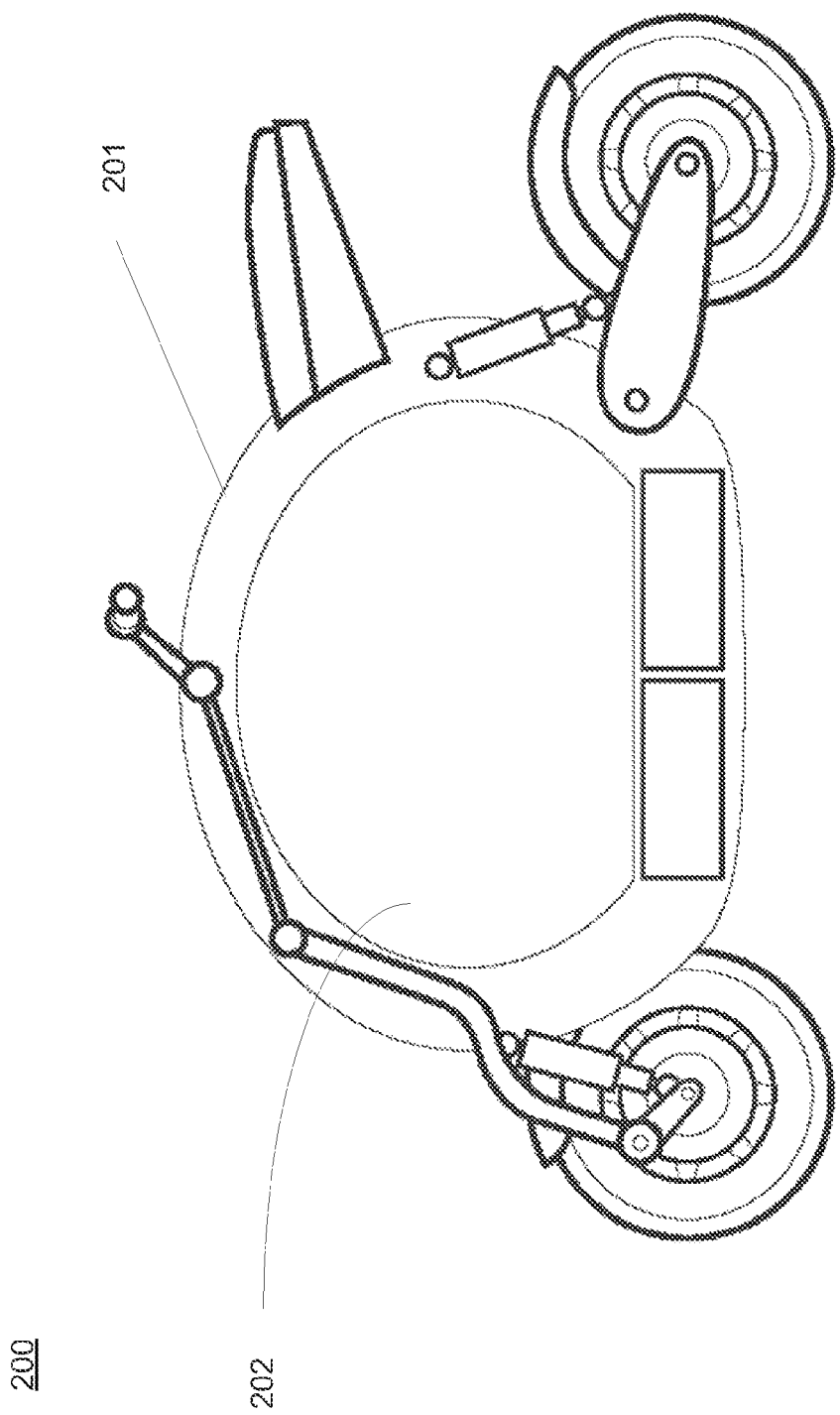
FIG. 2A is a diagram of an assembled scooter according to an embodiment of the invention.

FIG. 2A is a diagram of an assembled scooter according to an embodiment of the invention. In this embodiment, scooter 200 includes frame 201 having void 202. In this embodiment, frame 201 has a relatively elliptical shape, and also has a similar formed closed curve that forms void 202.

Figure 2B:
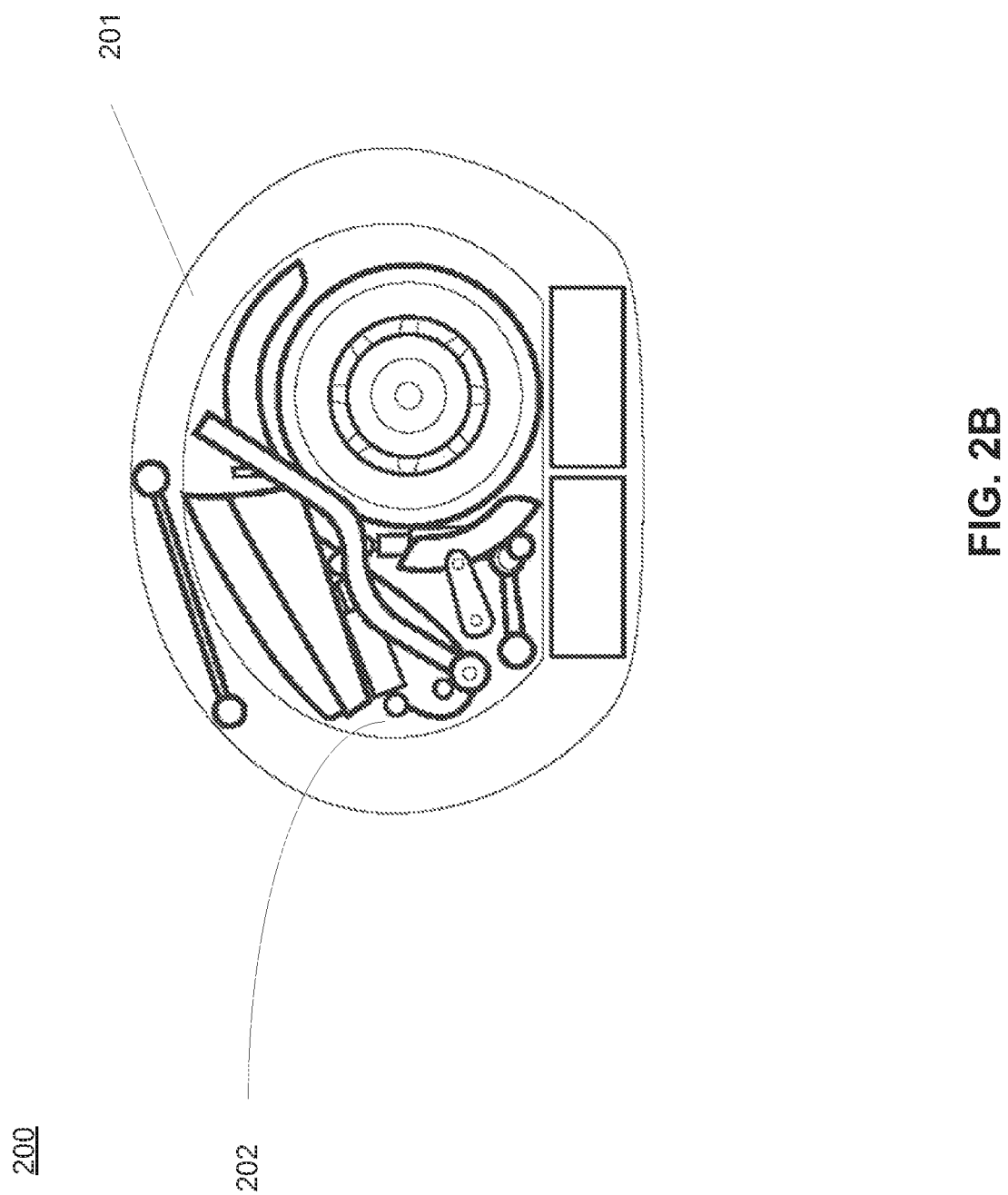
FIG. 2B is an illustration of a packaged disassembled scooter according to an embodiment of the invention.

FIG. 2B is an illustration of a packaged disassembled scooter according to an embodiment of the invention. In this embodiment, removable components of scooter 200 are formed to be able to all be placed within void 202 so as to not affect the volume of the scooter when disassembled and packed. Thus, when disassembled, the volume of scooter 200 is defined by the dimensions of frame 201.

Efficient and compact packaging of vehicles may be realized by either designing the vehicle based on a target packaging process, or designing a packaging process based on the form of the disassembled vehicle. By having the packaged disassembled scooter confined by the frame, a wider range of selection for protective packaging solutions and materials may be used. Furthermore, efficient packaging solutions eliminate or reduce the possibility of excessive waste for packaging and shipment.

Thus, as shown in this example embodiment, efficient and compact packaging may be realized by embodiments of the invention for non-rectangular shaped vehicle frames. In other words, embodiments of the invention more effectively "cube out" any non-rectangular design scooter design for packaging in a disassembled state.

Figure 3A:
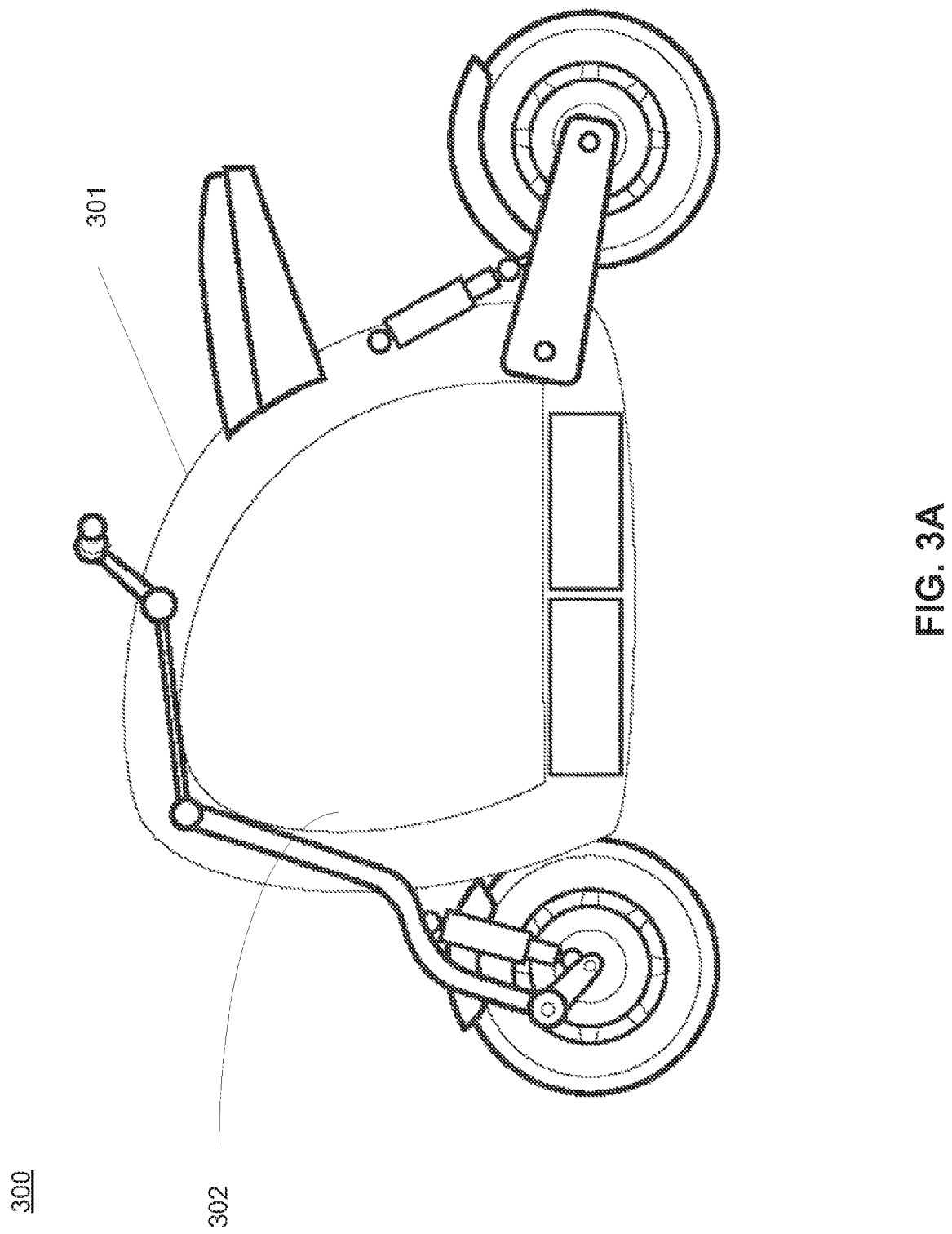
FIG. 3A is a diagram of an assembled scooter according to an embodiment of the invention.

FIG. 3A is a diagram of an assembled scooter according to an embodiment of the invention. In this embodiment, scooter 300 includes frame 301 having void 302. In this embodiment, frame 301 has a relatively free-form shape (i.e., has a combination of curved and straight sides) and also has a similar formed closed path that forms void 302.

Figure 3B:
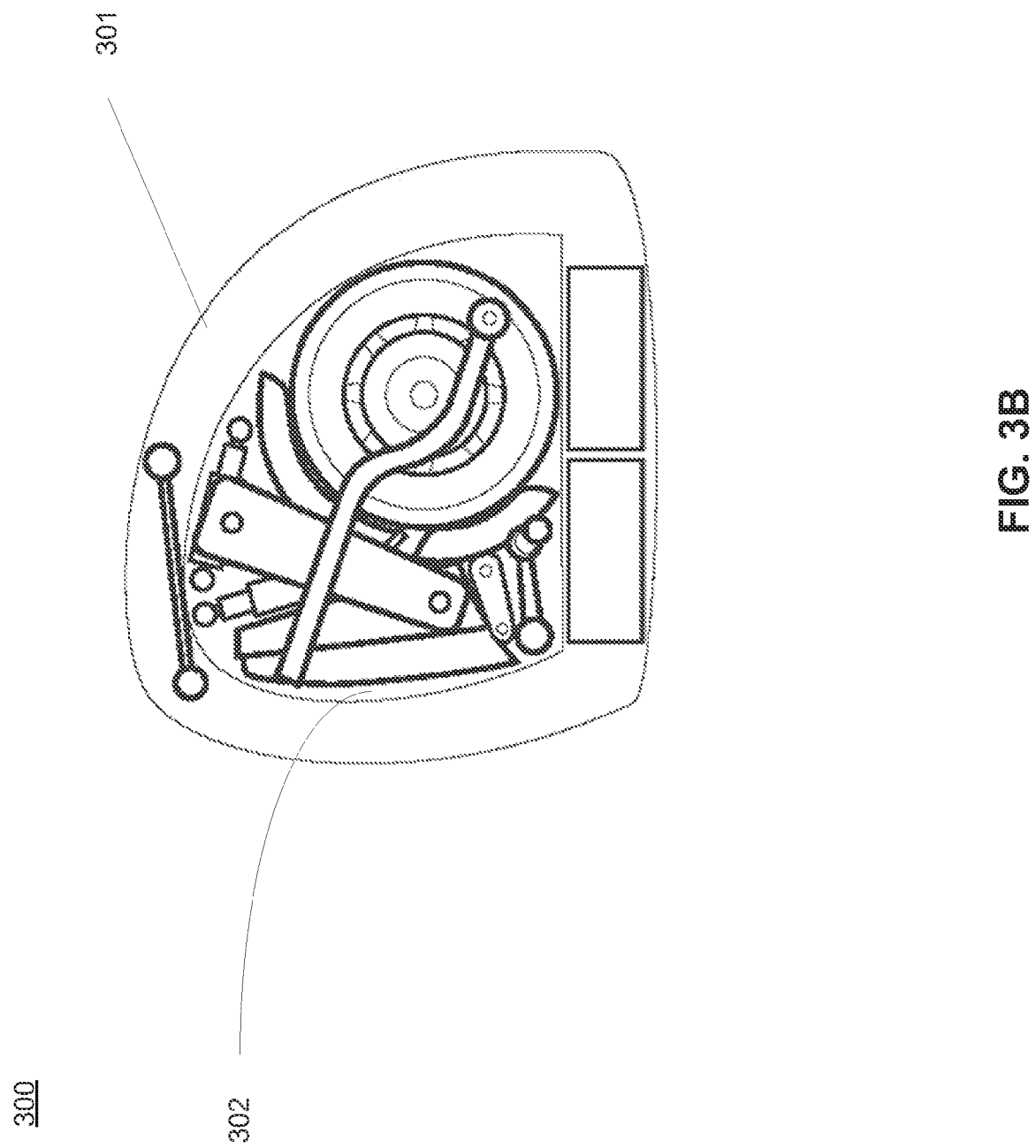
FIG. 3B is an illustration of a packaged disassembled scooter according to an embodiment of the invention.

FIG. 3B is an illustration of a packaged disassembled scooter according to an embodiment of the invention. In this embodiment, removable components of scooter 300 are formed to be able to all be placed within void 302 so as to not affect the volume of the scooter when disassembled and packed. Thus, when disassembled, the volume of scooter 300 is defined by the dimensions of frame 301.

In some embodiments, the mechanical design of an assemble-able scooter is such that it does not require a highly skilled assembler, special tooling or a special manufacturing environment to assemble the packaged parts (e.g., components 103-108, 110, 112, 113, 116 and 117 as shown in FIG. 1B) to construct a complete and operational scooter or light weight motorcycle (e.g., scooter 100 as shown in FIG. 1A, scooter 200 as shown in FIG. 2A, and scooter 300 as shown in FIG. 3A). In some embodiments, scooter components such as a rear swing arm and a front suspension arm or fork are designed to collapse, fold, or dissemble in a manner to reduce the packaging/shipping volume and eliminate the need for a final assembly factory process.

Figure 4:
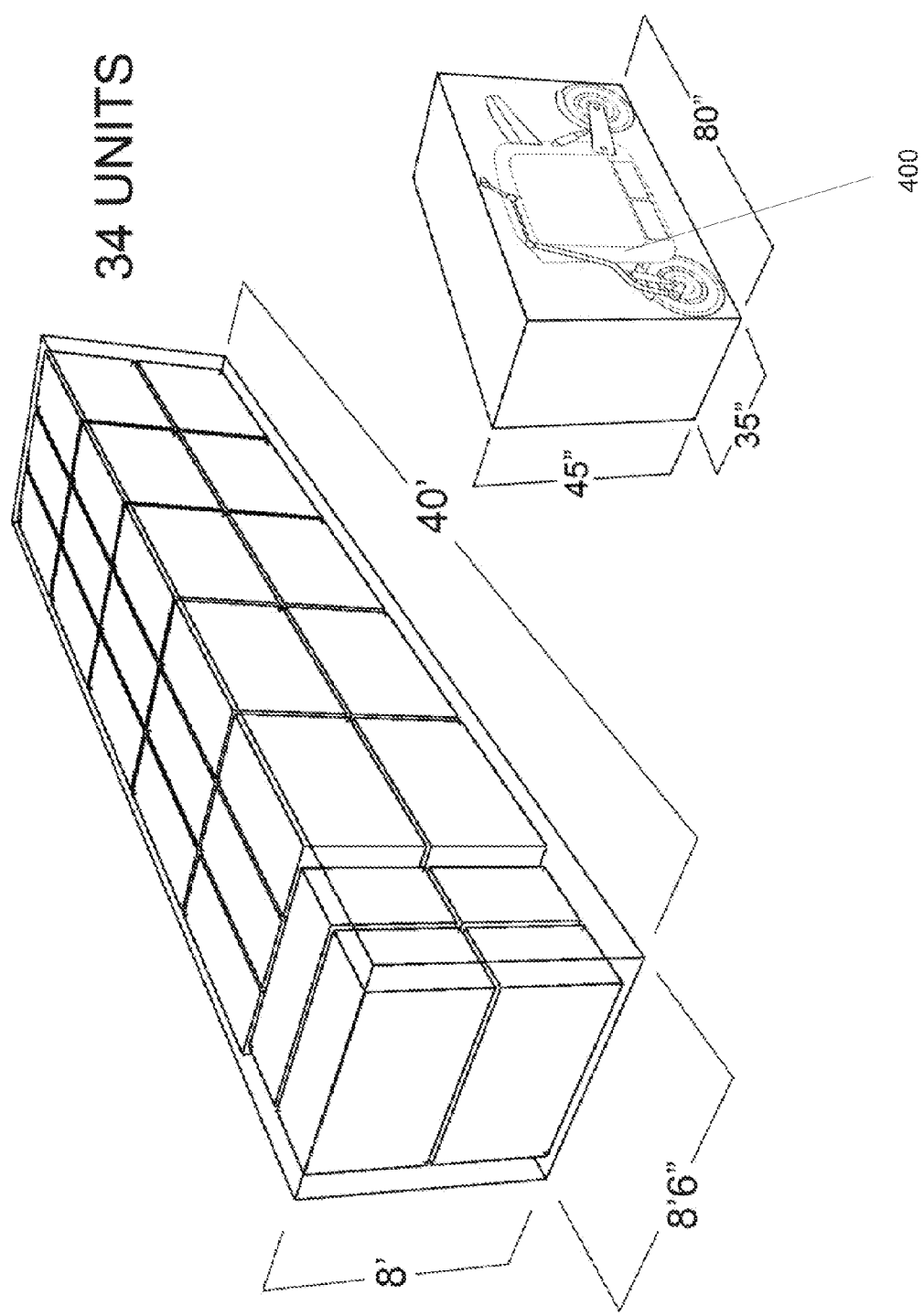
FIG. 4 is a block diagram of a plurality of assembled scooters that are packaged according to the prior art.

FIG. 4 is a block diagram of a plurality of assembled scooters that are packaged according to the prior art. In this figure, the volumes of said packages are determined by the dimensions of the scooters as assembled in an operational (or near operational) state. In this figure, said dimensions of the scooter packages are shown to be a length of 80 inches, a height of 45 inches, and a width (i.e., depth) of 35 inches; thus, as shown in FIG. 4, scooter 400 is shown to have similar dimensions in its assembled state (any resemblance of scooter 400 to scooter 100 of FIG. 1A is for the illustrative purpose of showing an assembled scooter; the inclusion of scooter 400 in FIG. 4 is not to be interpreted as an admission that scooter 400 is prior art). As illustrated in this figure, prior art methods of packaging assembled scooters results in a grouping of 34 units (of scooters such as scooter 400) that may be stacked and grouped together. In this illustration, said grouping of assembled scooters are arranged to fit within an International Organization for Standardization (ISO) IAA type container of dimensions 40'×8'×8'6".

Figure 5:
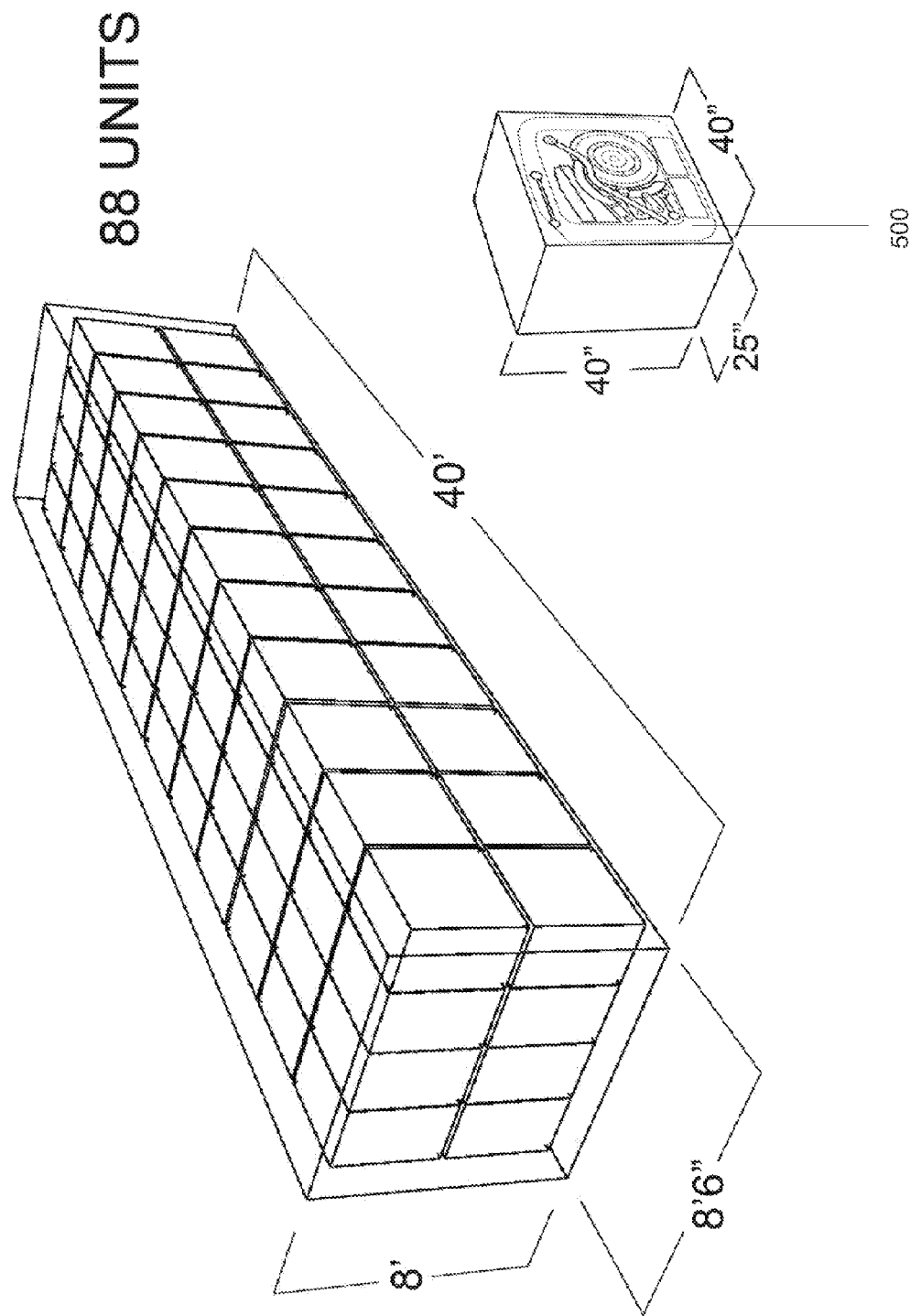
FIG. 5 is a block diagram of a plurality of packaged disassembled scooters according to an embodiment of the invention.

FIG. 5 is a block diagram of a plurality of packaged disassembled scooters according to an embodiment of the invention. Scooters such as scooter 500 are to be packaged in their disassembled state (shown to be similar to scooter 100 of FIG. 1B). In this embodiment, the volumes of said disassembled scooters are determined by the dimensions of their frames, and not by the dimensions of their completed, operational state as in the prior art. In this embodiment, said dimensions of scooter 500 in its disassembled state are shown to be a length of 40 inches, a height of 40 inches, and a width (i.e., depth) of 25 inches. Thus, said scooter frames will include a closed path/curve void having a depth of no more than 25 inches, and include a plurality of removable components formed to fit in said void together. In this embodiment, said scooter packages form a grouping of 88 units that may be stacked and grouped to fit within an ISO IAA type container of dimensions 40'×8'×8'6" (compared to 34 units as shown in the prior art illustration of FIG. 4). In other embodiments, said scooter packages according to embodiments of the invention may be designed and grouped to fit within a container consistent with any ISO specification for containers (e.g., Technical Specification for Steel Dry Cargo Container, Spec. No. ITRU-40'-SA, Jun. 12, 2001).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. An apparatus comprising:
    a scooter frame including
        a void having a depth and a shape formed by a curve or closed path;
        a front side; and
        a back side;
    a front wheel to be coupled to the front side of the scooter frame and a rear wheel to be coupled to the back side of the scooter frame, the front and rear wheel to have a combined width less than or equal to the depth of the void of the scooter frame;
    a steering system to be coupled to the scooter frame and comprising at least one removable component;
    front and rear suspension components to be removably coupled to the scooter frame; and
    a seat to be removably coupled to the scooter frame;
    wherein the front and rear wheel, the at least one removable component of the steering system, the front and rear suspension components, and the seat are formed to fit within the void of the scooter frame together.

2. The apparatus of claim 1, wherein the shape of the void is a polygonal shape.

3. The apparatus of claim 2, wherein the polygonal shape is a quadrilateral shape.

4. The apparatus of claim 2, wherein the polygonal shape is a cyclic shape.

5. The apparatus of claim 1, wherein the shape of the void is an elliptical shape.

6. The apparatus of claim 1, wherein the shape of the void is a free-form shape.

7. The apparatus of claim 1, the seat to be coupled to the back side of the scooter frame.

8. The apparatus of claim 1, further comprising a motor to be included within a rear wheel assembly including the rear wheel.

9. The apparatus of claim 1, further comprising:
    a removable battery and a removable drive motor coupled to the frame;
    wherein the front and rear wheel, the at least one removable component of the steering system, the seat, the removable battery and the removable drive motor are formed to fit within the void of the scooter frame together.

10. The apparatus of claim 1, further comprising a battery to be included within the scooter frame.

11. A method for packaging a disassembled scooter, comprising:
    placing and stacking a front wheel and a rear wheel assemblies within a void of a scooter frame, the void having a depth and a shape formed by a curve or closed path, the front wheel assembly designed to be coupled to a front side of the scooter frame, the rear wheel assembly designed to be coupled to a back side of the scooter frame, and the front and rear wheel assembly to have a combined width less than or equal to the depth of the void of the scooter frame;
    placing at least one removable component of a steering system of the disassembled scooter in the void of the scooter frame;
    placing front and rear suspension components of the disassembled scooter within the void of the scooter frame; and
    placing a seat of the disassembled scooter in the void of the scooter frame;
    wherein a volume of the packaged disassembled scooter is defined by dimensions of the scooter frame.

12. The method of claim 11, the disassembled scooter further comprising a battery included within the scooter frame.

13. The method of claim 11, wherein the shape of the void is a polygonal shape.

14. The method of claim 13, wherein the polygonal shape is a quadrilateral shape.

15. The method of claim 13, wherein the polygonal shape is a cyclic shape.

16. The method of claim 11, wherein the shape of the void is an elliptical shape.

17. The method of claim 11, wherein the shape of the void is a free-form shape.

18. The method of claim 11, the disassembled scooter further comprising a motor included within the rear wheel assembly.

* * * * *